INVENTOR.
Wickliffe Jones.
BY
Wood, Herron & Evans.
ATTORNEYS.

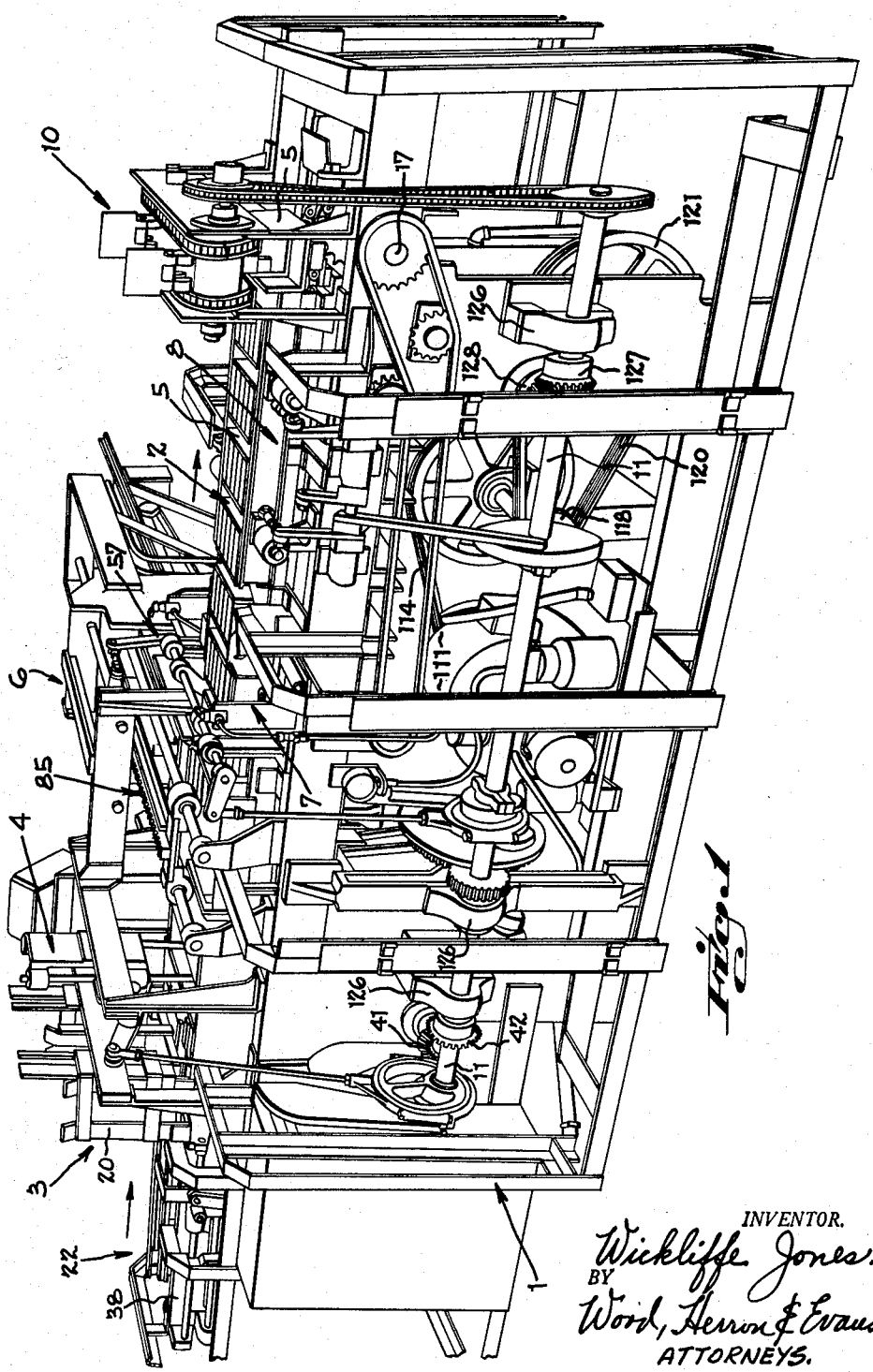

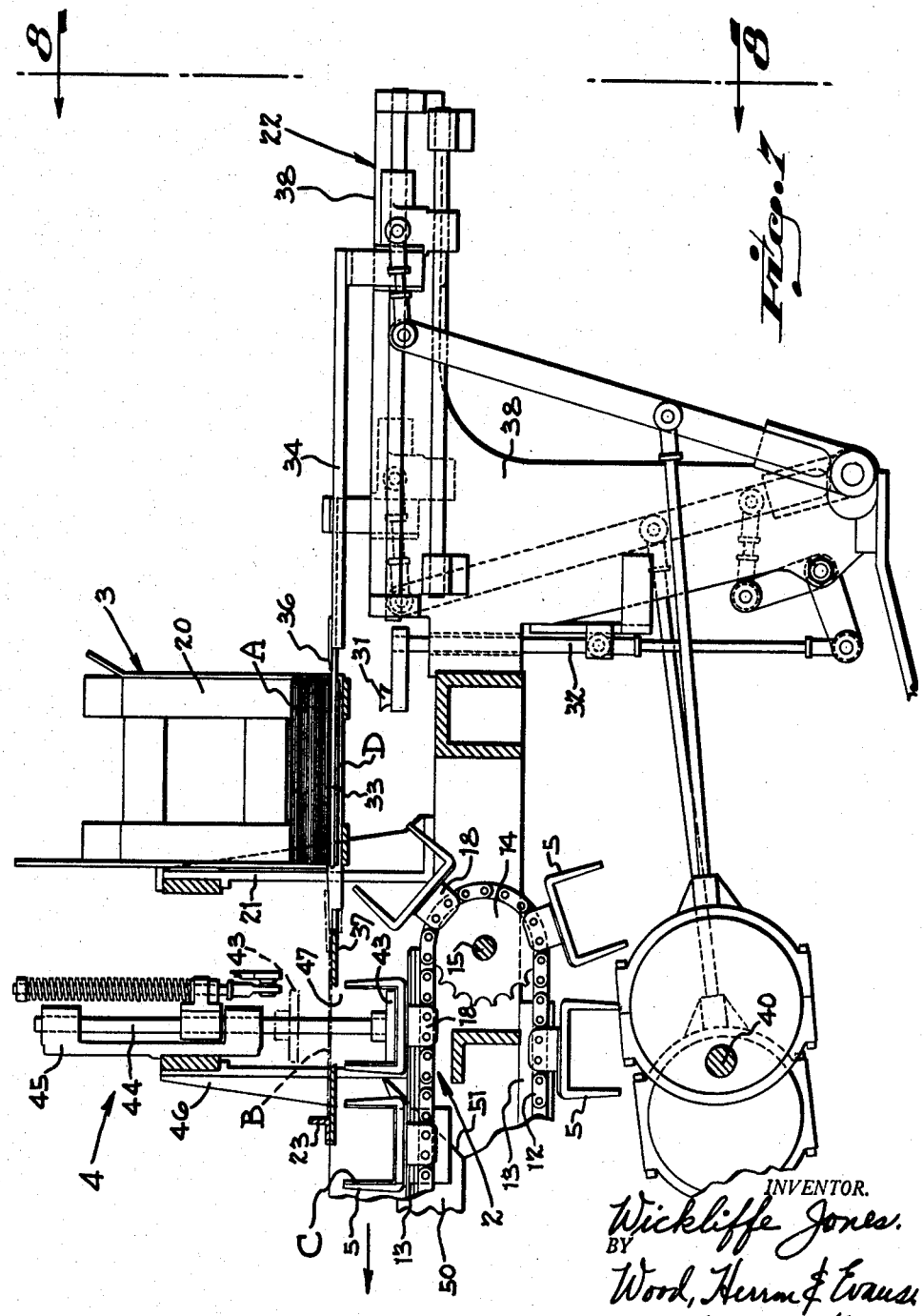

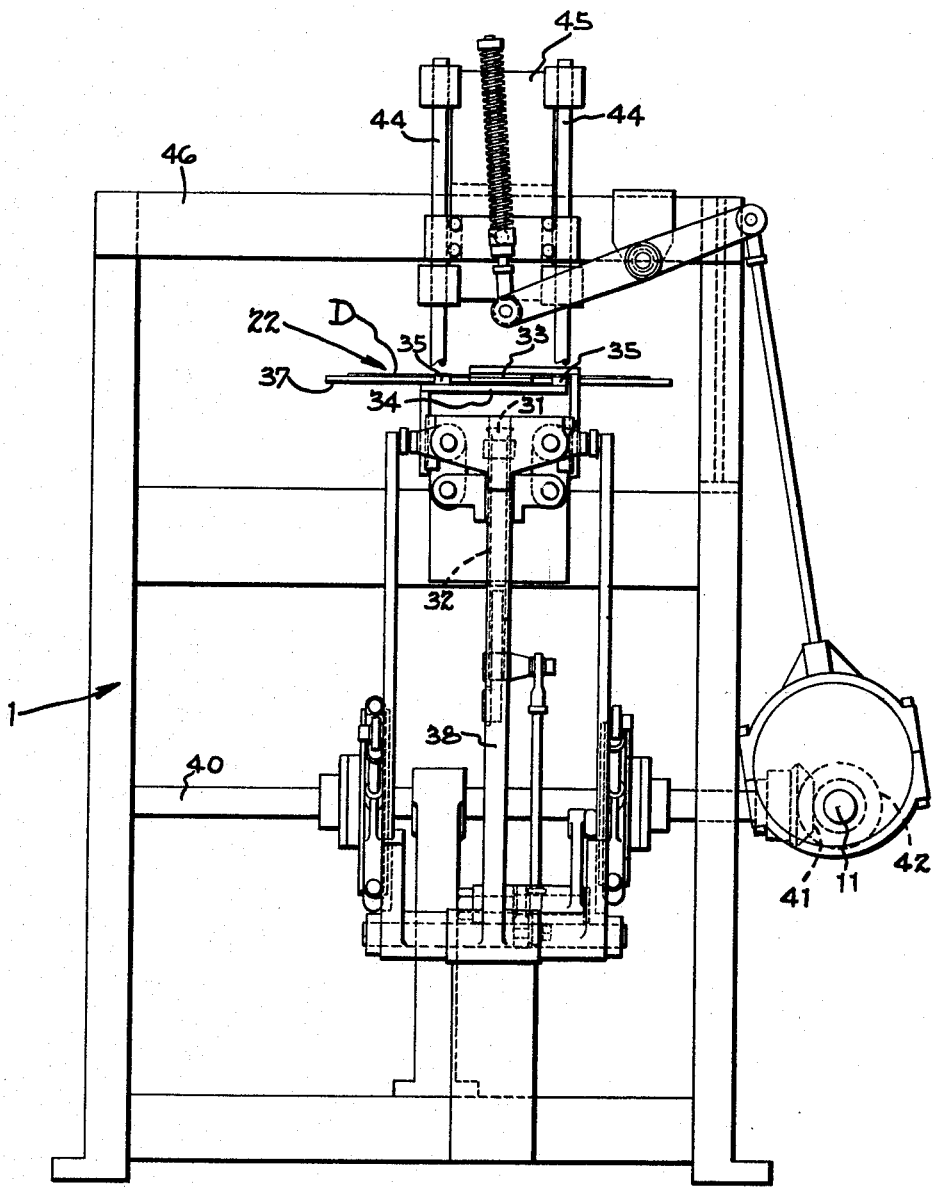

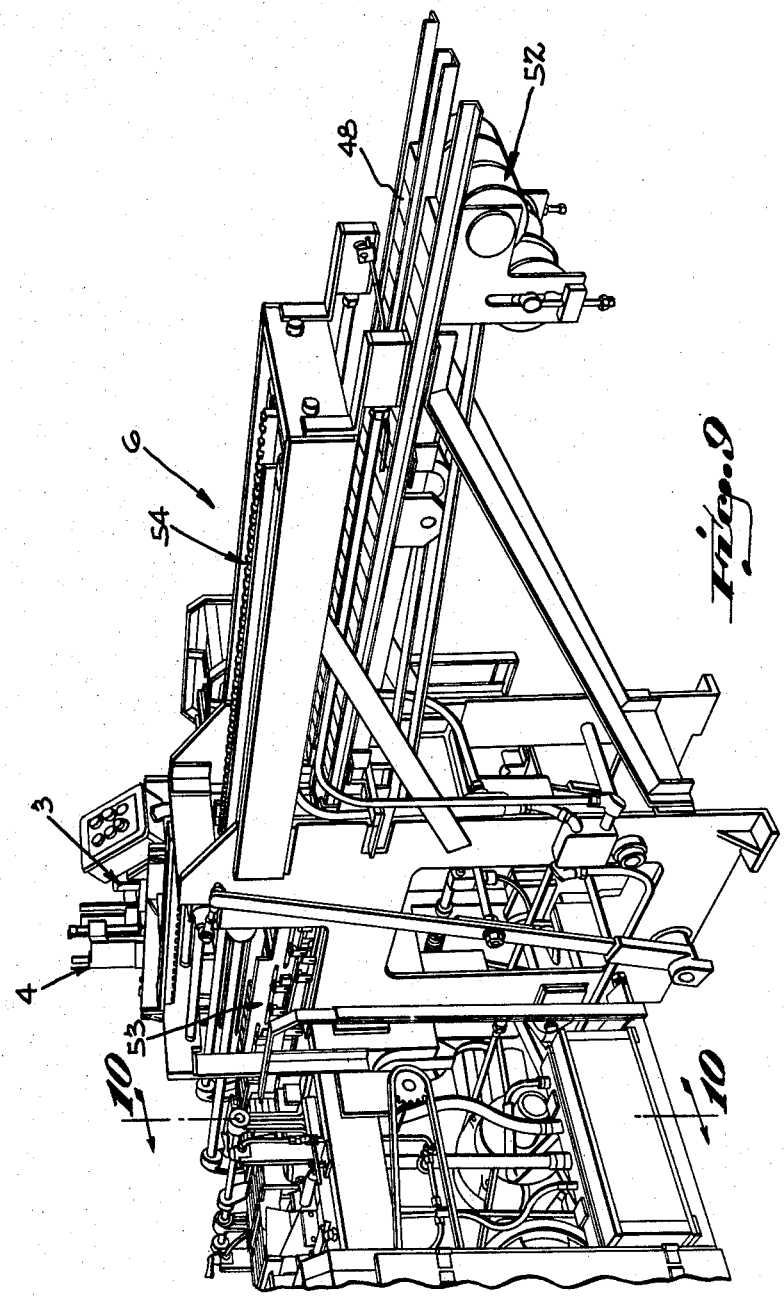

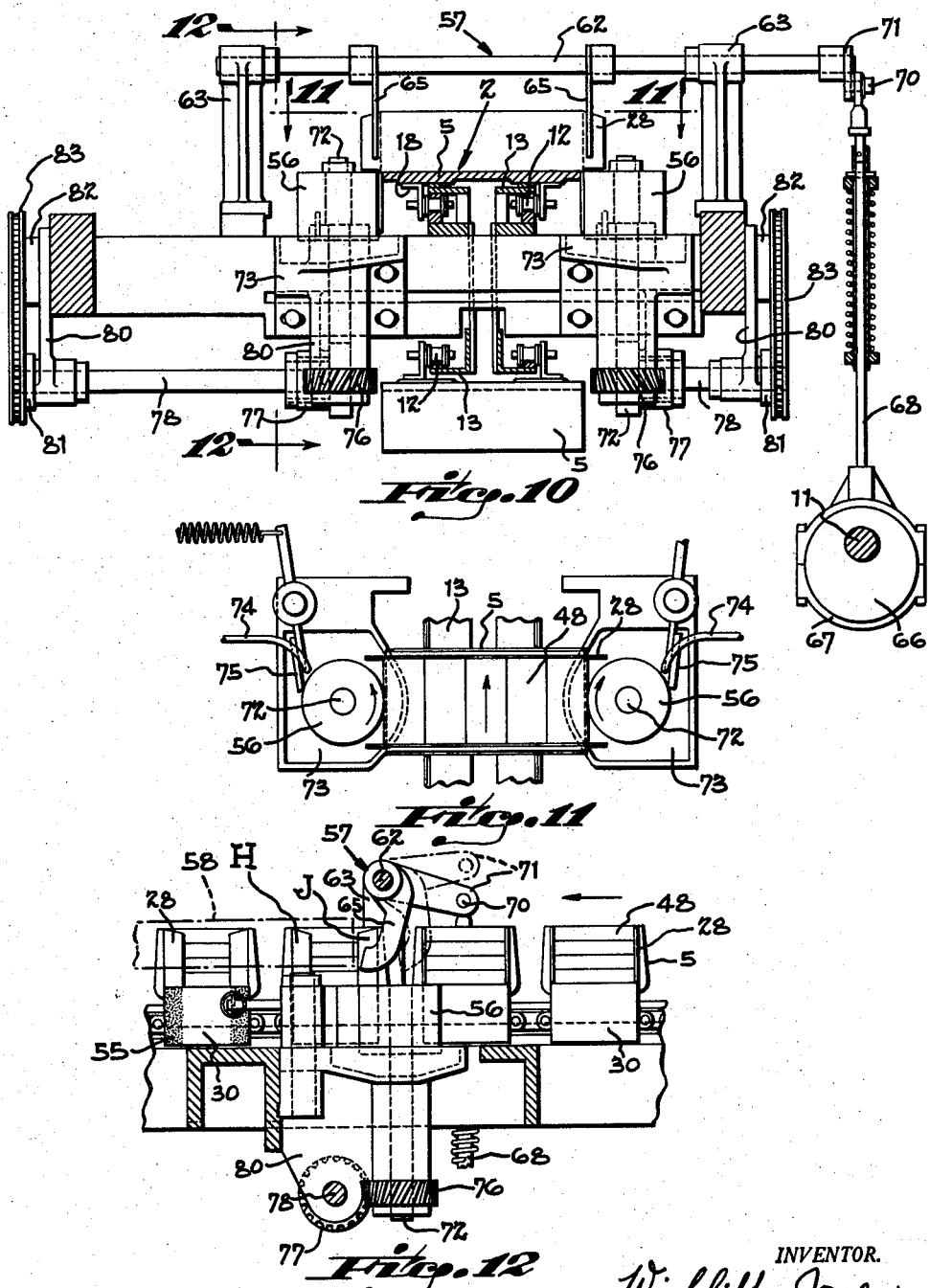

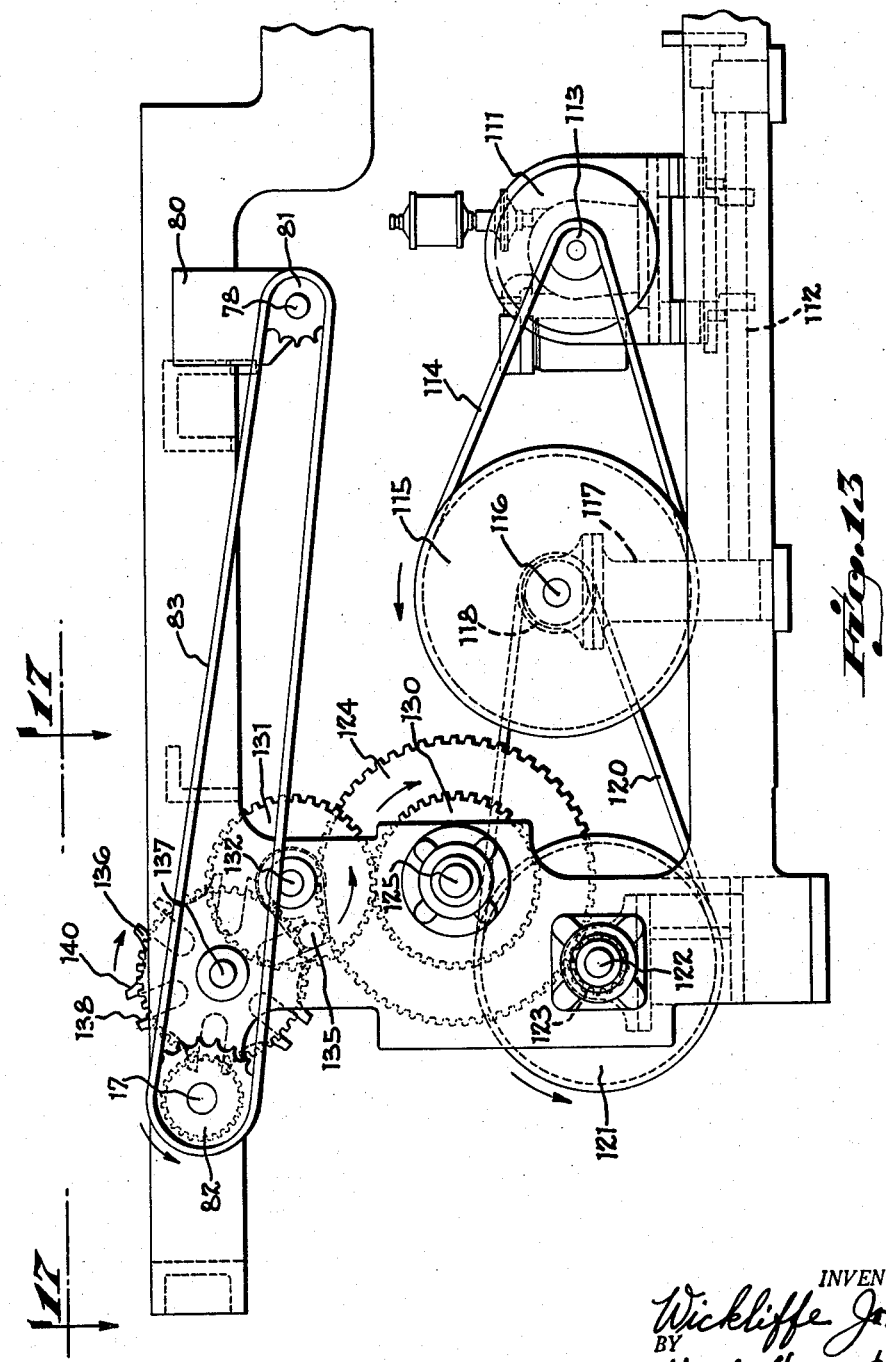

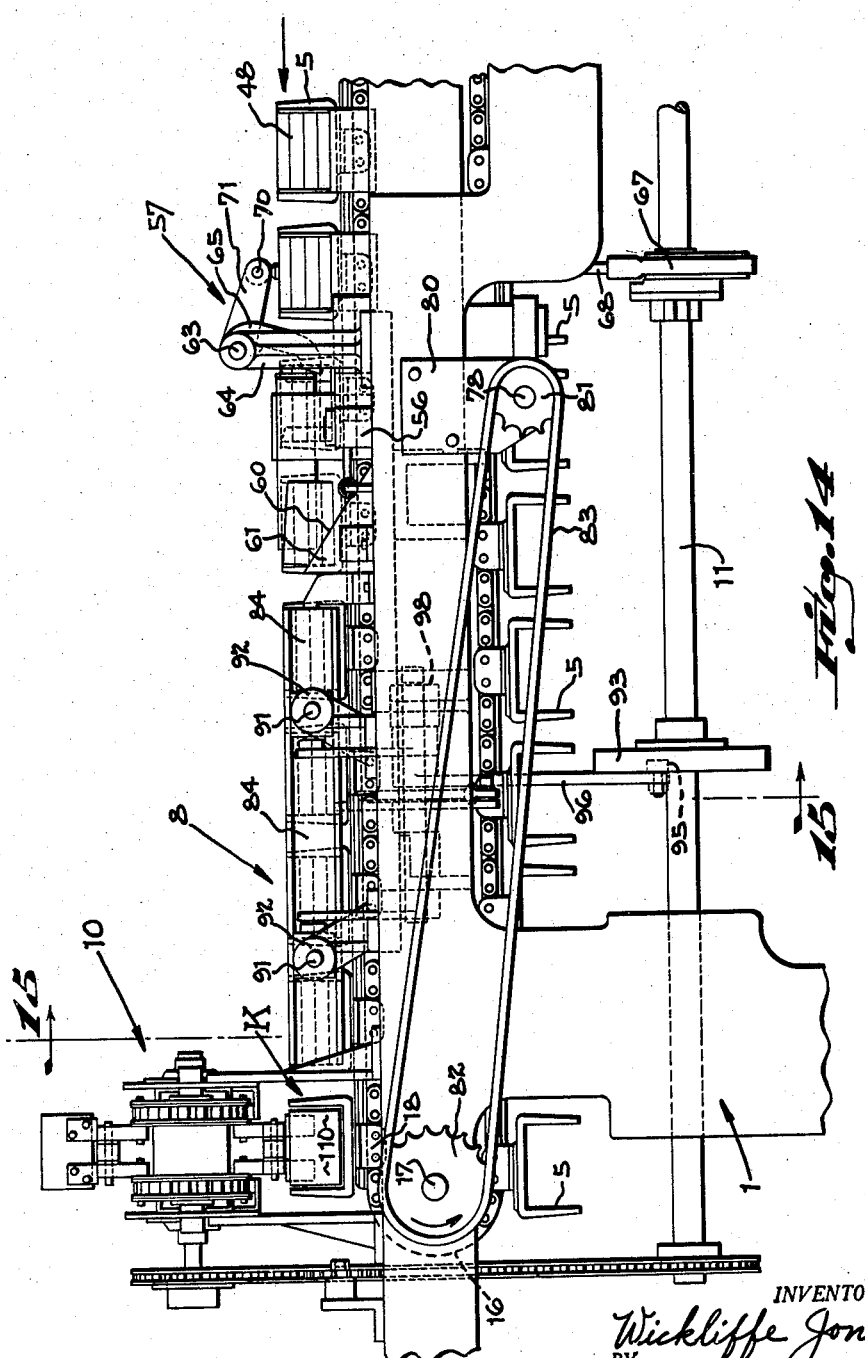

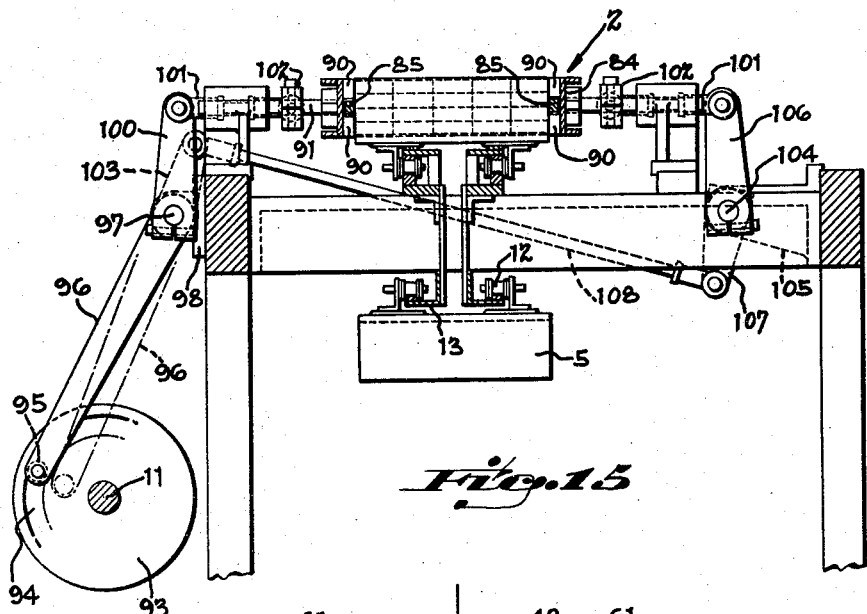

൹nited States Patent Office 3,147,576
Patented Sept. 8, 1964

3,147,576
FLAP CLOSING AND SEALING APPARATUS FOR TRAY-TYPE PACKAGING MACHINES
Wickliffe Jones, Cincinnati, Ohio, assignor to R. A. Jones and Company, Inc., Covington, Ky., a corporation of Kentucky
Original application Apr. 2, 1959, Ser. No. 803,712, now Patent No. 3,049,846, dated Aug. 21, 1962. Divided and this application Apr. 23, 1962, Ser. No. 189,376
5 Claims. (Cl. 53—374)

This invention relates to an automatic packaging machine of the type arranged to load articles in stack formation into an open, tray-type container having flaps at opposite ends which are closed and sealed after the articles are loaded into the container.

The present application is a division of the co-pending application of Wickliffe Jones for "Tray-Type Cartoning Machine," Serial No. 803,712, which was filed on April 2, 1959, now Patent 3,049,846.

The original application (Serial No. 803,712) discloses a packaging machine wherein the containers are introduced into the machine in the form of flat blanks to be fed individually from a magazine and partially erected. After having been partially erected and loaded with the articles, an adhesive coating is applied to the main closure flaps which extend from the bottom wall at opposite ends of the container blanks. Thereafter, the side wall flaps are folded to a closed position, then the freshly glued main flaps are folded upwardly to the closed position to bring the adhesive coating into sealing engagement with the previously folded end wall flaps to complete the formation of the container.

Described generally, the blanks are formed from an appropriate grade of paperboard material, each blank having a pair of longitudinal score lines delineating a bottom and a pair of side walls, together with transverse score lines delineating the main closure flaps and the pairs of side flaps at opposite ends of the blank. Each blank is fed individually from a magazine which confines the flat blanks in stacked formation and which feds them individually from the lower end of the magazine to an intermittently advancing conveyor. The conveyor includes channel-shaped carrier buckets adapted to receive the individual blanks. Thus, during each stationary dwell period of the conveyor, a tamping mechanism forces a flat blank downwardly into the channel-shaped carrier or bucket, and in so doing, folds the blank along its longitudinal score lines to create a partially erected channel-shaped tray, with the flaps projecting outwardly from the opposite ends of the tray.

The partially erected tray is then advanced by the intermittent transport conveyor to the article loading and flap sealing mechanisms, which are mounted along the transport conveyor downstream from the magazine.

One of the primary objectives of the present invention has been to provide a mechanism for closing and sealing the flaps of the container, utilizing the articles which are packed into the tray as a support for the closure flaps as they are folded to a closed position and sealed with an adhesive under pressure, which is applied to the main flaps at opposite ends of the partially erected tray.

After having been partially erected in the channel-shaped conveyor buckets, the trays are advanced by the transport conveyor to a loading apparatus. The loading apparatus forms the articles into a stack comprising several layers of articles, then advances the stack longitudinally into the open end of the partially erected tray. After advancing from the loading apparatus, the articles which are packed into the tray act as an internal support for the closure flaps during the subsequent flap folding, gluing and sealing operations, thus simplifying these components of the machine.

A further objective of the present invention has been to provide a simplified mechanism for applying adhesive to main closure flaps of the tray and for folding and sealing the freshly glued flaps by pressing them against the articles which are loaded into the tray, utilizing successive applications of sealing pressure against the folded flaps to partially set the freshly applied adhesive in a rapid efficient manner.

According to this aspect of the invention, the side flaps, which project outwardly from the side walls of the partially erected channel-shaped tray, are folded inwardly toward one another at opposite ends of the tray to overlie the articles which have been previously packed into the tray. Thereafter, an adhesive coating is applied to the main flaps, which extend from the bottom wall of the channel-shaped tray at opposite ends. After the adhesive coating is thus applied, the freshly glued main flaps are folded upwardly to bring the adhesive coating into facial contact with the previously folded side flaps, then the tray is advanced into the flap sealing apparatus.

The sealing apparatus of this invention essentially comprises a pair of opposed reciprocating bars and companion pair of stationary bars engagable with the external surface of the main closure flaps at opposite ends of the container after the flaps have been folded upwardly into adhesive contact with the inwardly folded side flaps. After the freshly glued main closure flaps are folded to the closed position, the loaded tray dwells at the upstream end of the reciprocating bars, then the bars shift inwardly toward one another to apply pressure to the freshly glued flaps from opposite ends of the loaded tray. The sealing pressure, as noted above, is resisted by the stack of articles confined within the tray. At the end of the conveyor dwell period, the reciprocating pressure bars retract to a disengaged position to allow the tray to be advanced by the conveyor to its next dwell position. During advancement, the stationary bars hold the flaps in closed position but do not apply significant pressure to the flaps. During the next dwell period, the reciprocating bars are again shifted toward one another to apply pressure to the flaps at opposite ends of the tray. The application of pressure to the freshly glued and folded flaps is thus repeated several times during advancement of the tray toward the discharge end of the machine. It has been found that this repeated application of endwise pressure brings about a more rapid and effective bonding of the closure flaps than is possible with machines which apply pressure to the flaps continuously during a corresponding period of time. After emerging from the downstream end of the reciprocating and stationary bars, which constitute the sealing station, the loaded and sealed trays are discharged from the machine.

The various features and advantages of the present invention will be more fully apparent to those skilled in the art from the following description taken in conjunction with the drawings.

In the drawings:

FIGURE 1 is a perspective view, generally illustrating a packaging machine embodying the principles of the present invention.

FIGURES 2 to 6 inclusive illustrate in perspective the several operations of forming the tray from a flat paperboard blank; of bending and inserting the partially formed blank into the carrier or bucket of the conveyor; of introducing the merchandise endwisely into the channel-shaped tray; and of closing and sealing the end flaps according to the present invention to complete the packaging of the mechandise.

FIGURE 7 is a fragmentary side view partially in section, illustrating the magazine feed mechanism which advances individual trays in blank form to the folding mechanism, subsequently to be bent to a channel shape and concurrently introduced tinto the buckets of the conveyor for stepwise advancement relative to the loading and sealing stations of the machine.

FIGURE 8 is an end view, as projected along line 8—8 of FIGURE 7, further illustrating the blank feeding mechanism and a porton of the tray folding mechanism, the magazine being omitted for the sake of clarity.

FIGURE 9 is a fragmentary perspective view, generally illustrating the loading station which advances the layers of merchandise into the trays after they have been folded and inserted into the buckets of the conveyor.

FIGURE 10 is a sectional view, taken along line 10—10 of FIGURE 9, illustrating the flap folding mechanism and glue rolls which act upon opposite ends of the tray after it advances from the loading station.

FIGURE 11 is a top plan view, taken along line 11—11 of FIGURE 10, further illustrating the glue applicator mechanism, the flap folders being omitted for clarity.

FIGURE 12 is a fragmentary sectional view, taken along line 12—12 of FIGURE 10, further illustrating the flap gluing and folding mechanism.

FIGURE 13 is a fragmentary side elevation as viewed from the side shown in FIGURE 9, showing the driving system which provides the intermittent advancement of the tray conveyor.

FIGURE 14 is a fragmentary view generally similar to FIGURE 13, showing the discharge portion of the machine and particularly the mechanism which seals the tray flaps after advancement beyond the folding and gluing station. This view also shows the discharge conveyor which shifts the finished packages laterally from the buckets of the carton conveyor at the discharge end of the machine.

FIGURE 15 is a fragmentary sectional view, taken along line 15—15 of FIGURE 14, further illustrating the flap sealing mechanism in relation to the carton conveyor.

FIGURE 16 is a top plan view projected from FIGURE 15, further detailing the flap sealing mechanism.

FIGURE 17 is a fragmentary top plan, as viewed along line 17—17 of FIGURE 13, further illustrating the gear train, and particularly its driving connection with the intermittent transport conveyor and glue rollers.

*General Arrangement*

Figure 1:
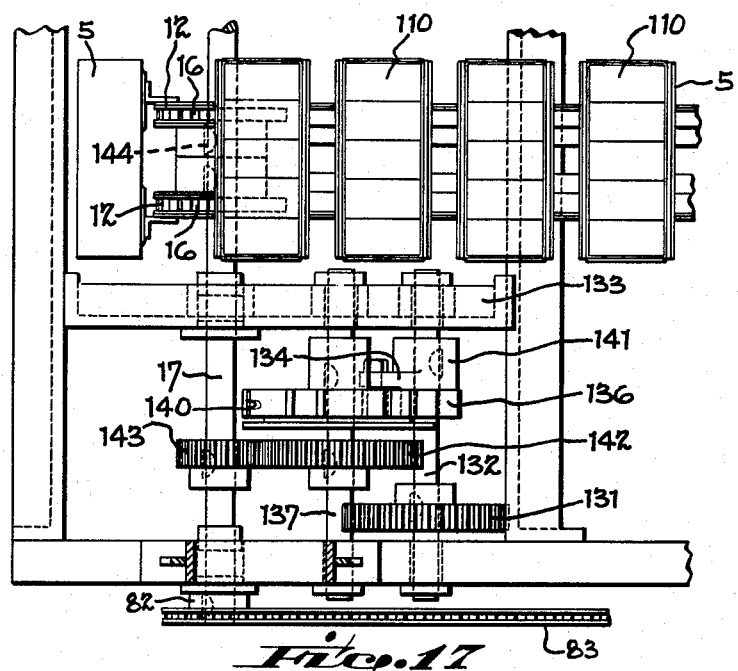
Figures 2, 3, 4:
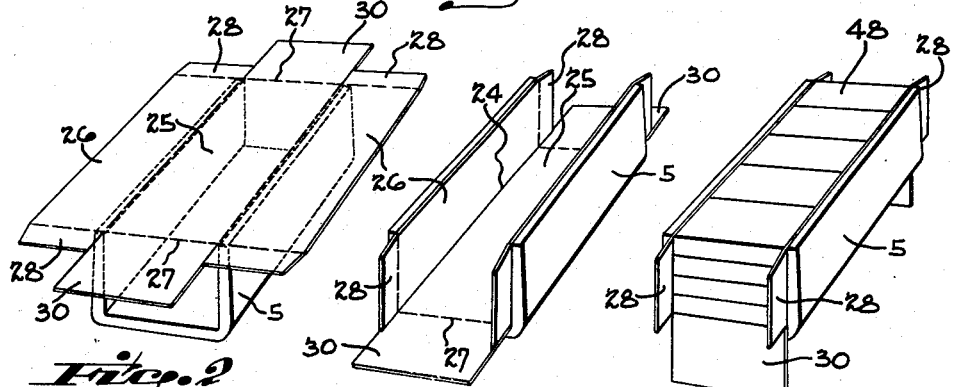

Referring to FIGURE 1, the machine in general comprises a rigid frame 1, supporting an intermittent conveyor 2 which advances the trays or cartons with respect to the several components of the machine in the direction indicated by the arrow. At the loading end, the machine is provided with a magazine 3 which supports a stack of paperboard trays in flat blank condition. The magazine includes a feed mechanism, as explained later, which advances the flat blanks individually to a folding or tamping apparatus 4 residing above the conveyor. The conveyor is provided with channel-shaped carriers or buckets 5 which are advanced intermittently, in stepwise fashion, with respect to the tray forming or tamping apparatus (FIGURE 2). The tray tamping apparatus 4 pushes each tray blank downwardly into the respective conveyor buckets during conveyor dwell, and in so doing, folds the paperboard blank to a channel shape interfitting the conveyor bucket, as shown in FIGURE 3.

After the initial tray forming operation, the conveyor buckets, with their partially formed trays, advance to a loading station 6, at which point the merchandise is advanced laterally into the open end of the tray during the conveyor dwell period. As explained later, the loading station 6 includes a belt-type article conveyor which advances the merchandise, such as relatively small cartons, to a collecting station forming a part of the loading station. The collecting station reforms the articles, which advance in random fashion, into solid rows, then regroups the row into several elevated planes one above the other. The several rows are then laterally and endwisely advanced into the tray (FIGURE 4), such that the rows from layers of merchandise residing one upon the other within the tray.

Figures 5, 6:
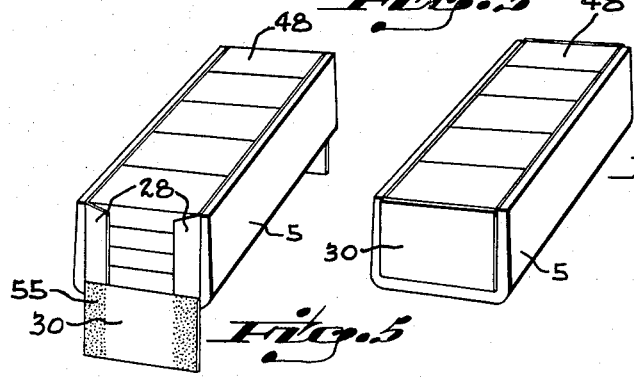

During subsequent stepwise advancement of the conveyor buckets, the loaded trays are intercepted by a flap folding and gluing station, indicated generally at 7 (FIGURE 5). At this station, the side wall flaps are folded inwardly to reside against the opposite ends of the merchandise, and liquid glue is applied to the downwardly folded main flaps at opposite ends of the tray.

The conveyor buckets now advance the filled trays to the flap closing and sealing station indicated at 8 (FIGURE 1). During intermittent advancement through this station, the main flaps are folded to a closed position overlying the side flaps (FIGURE 6) such that the freshly glued portions of each main flap resides in facial contact with the side flaps. Upon advancement intermittently through this station, sealing pressure is applied against the main flaps during the conveyor dwell periods and is released during the stepwise advancements, so as to set the adhesive bond between the flaps. As noted earlier, this successive application of pressure to the flaps brings about a more rapid and efficient adhesive bonding action than is possible with machines which apply continuous sealing pressure.

After the loaded trays are advanced through the sealing station 8, they dwell intermittently in registry with a discharge conveyor 10 (FIGURE 1). The discharge conveyor 10 comprises a pair of chain runs extending transversely above the tray conveyor 2, the runs being provided with pushers which advance through the channel-shaped buckets and thereby push the sealed trays laterally to a delivery chute. From the delivery chute, the loaded trays are advanced to a suitable machine which may apply a closure, such as a transparent wrapper, about the package, to envelope the merchandise.

The several components of the machine, described briefly above, are all operated in synchronism with the stepwise advancements of the tray conveyor 2. These components are all driven from the common drive shaft 11 which extends longitudinally of the machine. The drive shaft is provided with suitable cams and linkages for actuating the reciprocating components and for driving the conveyors, as explained in detail later.

*Magazine Feed and Tray Conveyor*

The magazine 3 and associated mechanism is viewed in FIGURE 7 from the side opposite that shown in FIGURE 1; consequently, the tray conveyor 2 is shown advancing in the opposite direction, as indicated by the arrow. As shown, the tray conveyor 2 comprises a pair of endless conveyor chains 12—12 (FIGURE 10) supported by suitable upper and lower chain guides 13 which are mounted upon the frame 1 of the machine. The conveyor chains are tracked about a pair of idler sprockets 14 carried on an idler shaft 15 at the loading end of the machine (FIGURE 7), shaft 15 being loosely journalled in the frame. The opposite end of the conveyor chains are tracked about a similar pair of sprockets 16 (FIGURE 14) which are carried upon a drive shaft 17. The drive shaft 17 is advanced intermittently by a driving system, including a geneva gear, which is described later with reference to FIGURE 13. The driving system is arranged to advance the conveyor in steps, the length of the steps corresponding with the spacing of carriers or buckets 5. As shown in FIGURES 7 and 10, the buckets or carriers 5 are attached to the conveyor chains 12 by respective lugs 18 which extend from the bottom of each bucket at opposite ends. As the empty carriers pass around the idler sprockets 14, each bucket dwells beneath the folding or tamping station 4 to receive the blank tray which is fed from the magazine 3.

Referring again to FIGURE 7, the magazine 3 comprises respective vertical angle members 20 supported with respect to frame 1 by a bracket 21 adjacent the loading end of the conveyor. The paperboard blanks, as indicated at A, are loosely confined in stack formation in the magazine and are advanced individually from the bottom of the stack by a feed mechanism indicated generally at 22. The feed mechanism advances the individual blanks horizontally from the magazine to a position engaging a stop 23, such that the blank resides above the stationary conveyor bucket 5. The ejected blank is shown in FIGURE 7 in broken lines and is indicated at B. During the nex cycle of operation, the tamping or folding apparatus forces the blank into the bucket, as indicated at C.

As shown in FIGURES 2 and 3, the blanks are scored longitudinally as at 24 to delineate a bottom 25 and side walls 26—26 upon being tamped into the bucket. The blanks are also provided with transverse score lines 27—27 which delineate respective pairs of side wall flaps 28—28 and main flaps 30—30. The mechanism of the present invention for folding and gluing these flaps to enclose the merchandise is described later.

Described in detail (FIGURES 7 and 8), the feed mechanism 22 comprises two plungers which reciprocate in opposite directions relative to one another, one of the plungers separating the lowermost blank D from the stack in the magazine and the second plunger advancing the blank to the position previously indicated at B. In order to separate the lowermost blank from the stack, there is provided a suction cup 31 mounted upon an actuating rod 32 for vertical reciprocation below the magazine. The suction cup 31 is reciprocated in time with the feeder mechanism to contact the bottom of the stack and to spring the lowermost blank D downwardly a sufficient distance to permit entry of the separator plunger for subsequent advancement. For this purpose, the suction cup is interconnected with a suction apparatus which applies suction in time with the reciprocations of the cup. Since the suction apparatus is well known in the art, it has been omitted from the drawings.

In the position of the parts shown in FIGURE 7, the separator plunger, which is indicated at 33, is shown in its extended or separating position while the feed plunger indicated at 34 is in its retracted position. The separator plunger 33 advances from its retracted position as the suction cup draws the central portion of the blank downwardly from the stack, so that its forward end may pass into the space and separate the blank D from the stack. As shown in FIGURE 8, the separator plunger 33 is relatively narrow so as to reside at the central portion of the stack, while the feed plunger 34 resides below the separator and includes a pair of pushers 35—35 which straddle the separator and engage the edge of the separated blank D. The feed pushers 35 include a thin nosepiece 26 (FIGURE 7) which prevents interference with the stack during its feeding motion.

During the cycle, the feed plunger 34 advances from the retracted postion shown in full lines in FIGURE 7 to the extended position, shown in broken lines, to advance the sheet as at B, while the separator plunger 33 retracts. Thereafter, the feed plunger 34 also retracts, then the suction cup rises and engages the next lowermost blank. At this point, the separator plunger 33 again begins to advance for the next cycle of operation. As the separated blank is fed from the stack toward the stop 23, it is supported by guide plates 37 which extend from the magazine to the tamping station 4.

The separator and feed plungers are mounted for reciprocation relative to a bracket 38 (FIGURE 7) extending from the loading end of the machine frame. The mechanism for reciprocating the separator and feed plungers does not form a part of the present invention and has been omitted from the description. The mechanism for reciprocating the suction cup 31 has also been omitted for the same reason. This mechanism is detailed in the aforesaid original application, Serial No. 803,712. This mechanism is driven by the common drive shaft 11, as noted earlier. Thus, as shown in FIGURE 8, the cross shaft 40 which drives the blank feed mechanism has its opposite ends journalled relative to the frame 1 and its outer end includes a bevel gear 41 meshing with a bevel gear 42 mounted on the longitudinal drive shaft 11, previously indicated in FIGURE 1. The cams and eccentrics for the remaining components of the machine are mounted directly on the common shaft 11, such that the reciprocating parts all operate in time with one another. The common shaft 11 is in driving connection with the motor driving system and also with the geneva drive which imparts stepwise advancement to the tray conveyor 2, as explained later.

Tray Forming or Tamping Station

The tray forming and tamping apparatus 4 is best shown in FIGURES 7 and 8 and comprises a presser foot 43 mounted upon a pair of vertical actuating rods 44 slidably journalled in a bearing fixture 45 adjacent the tray magazine 3. The fixture 45 is supported in stationary position by a bridge 46 rising from the frame 1 of the machine. The presser foot 43 normally resides in the elevated position shown in broken lines (FIGURE 7) as the tray blank is fed from the magazine to its position against stop 23 as shown at B. During the feeding motion, the conveyor advances the bucket into registry with the presser foot. It will be noted in FIGURE 7, that the support plate 37 is provided with an opening 47 having a width to permit the presser foot 43 to pass downwardly into the channel-shaped bucket 5, as shown in full lines in FIGURE 7. The width of the presser foot is slightly less than the width of the opening 47 and bucket 5. Accordingly, as the presser foot descends, it forces the central portion of the blank downwardly through the opening 47 toward the bucket.

The longitudinal score lines 24 of the blank (FIGURE 3) register with the opposite edges of the opening 47 when the blank resides against stop 23, thus causing the blank to be bent along the score lines to form the bottom 25 and side walls 26—26 as the presser foot forces the blank through the opening and tamps it downwardly into the bucket. Upon being forced into the bucket, the side walls of the blank tend to spring outwardly, thus holding the partially formed tray in place in the conveyor bucket. The tamping apparatus is reciprocated by a suitable mechanism as shown in the original application Serial No. 803,-712, which is driven by the common longitudinal drive shaft 11. Since this mechanism does not form an essential part of this invention, the structure has also been omitted from this description. It will be understood that the driving mechanism raises and lowers the presser foot 43 in time with the advancement of the conveyor buckets.

Loading Station

After the blank tray has been inserted into the conveyor bucket by the tamping apparatus 4, the intermittent transport conveyor advances the tray to the loading station 6, at which point the articles of merchandise, indicated at 48 (FIGURE 4), are advanced in group formation into the tray. In the present disclosure, the articles consist of small boxes of cough drops which are packed in the tray for shipment to the retailer. In the present example, as shown in FIGURE 4, the boxes are packed in four layers of five boxes each, making a total of twenty boxes per tray. After having been loaded, the end flaps are glued and sealed (FIGURES 5 and 6), then a wrapper subsequently may be applied. Upon being placed on sale, the retailer usually removes the wrapper and utilizes the tray itself as a display receptacle for the articles.

The loading station 6 loads two trays during each operating cycle. For this purpose, its components are in duplicate and are timed to reciprocate once while the tray conveyor makes two stepwise advancements. In other words, the loading mechanism loads two side-by-side trays with merchandise, then shifts to retracted position while the tray conveyor makes two stepwise advancements from the tray tamping mechanism 4. When two newly erected trays arrive at the loading station, the duplicate loading mechanism again advances the merchandise into the trays, then retracts. This cycle provides ample time for the loading apparatus to collect the articles and segregate them into layers, as explained in detail later.

In order to facilitate the loading and subsequent gluing and sealing operations, the main flaps 30 of the tray are folded downwardly to the position shown in FIGURE 4 before the tray reaches the loading station 6. For this purpose, there is provided a pair of flap retaining plates 50—50 (FIGURE 7) extending along opposite ends of the conveyor buckets, each plate having an inclined edge 51 which intercepts the main flaps 30 as the trays advance, so as to plow the flaps downwardly to the position shown. The flaps remain in this position as the trays advance to the loading station and until the loaded trays reach the gluing station (FIGURE 5), at which point the glue is applied to the flaps, after which they are plowed upwardly to be sealed.

The loading mechanism 6, as shown in FIGURE 9, includes an infeed conveyor 52 for advancing the articles 48 to the respective elevating mechanisms 53. As the articles are advanced toward the respective elevating mechanisms 53, they are arrested and reformed into solid rows on the conveyors; the two rows of articles subsequently are engaged by the elevators and segregated into individual layers for lateral transfer into the trays by the loading plunger 54. The loading mechanism is reciprocated in time with the other components of the machine by a driving connection with the common shaft 11, as described in the original application Serial No. 803,712.

*Flap Folding and Gluing Station*

As the loaded trays advance from the loading station, the side flaps 28 and main flaps 30 of the trays remain in the position shown in FIGURE 4 and the loaded tray is advanced to the flap folding and gluing station, previously indicated at 7 in FIGURE 1. Upon reaching this station, a pattern of liquid glue, as indicated at 55 in FIGURE 5, is applied to the main flaps 30—30 by a pair of glue rollers indicated at 56 in FIGURES 10-12. As shown, the glue rollers track against the surface of the main flaps 30 at opposite ends of the tray, in a plane below the side flaps 28.

After passing between the glue rollers, the side flaps 28 on the trailing side of the tray are folded to a closed position by a flap folding apparatus, indicated generally at 57 (FIGURE 12). The flaps on the leading side are closed by stationary flap closer plates 58, and finally the main flaps 30 are plowed to a closed position by the inclined edges 60 of the stationary flap closing plates 61—61 (FIGURE 14). As viewed in FIGURE 16, the closer plates 61 converge toward the sealing station 8 so as to close the flaps progressively. When the main flaps 30 are completely closed, the pattern of liquid adhesive (previously applied) is placed in facial contact with the previously folded side flaps 28, and the tray is then advanced through the flap sealing station 8, where the folded flaps are sealed. It will be observed that during the flap folding and sealing operations, the stack of boxes within the tray provides a backing which supports the flaps and thus facilitates the closing and sealing operations.

Described in detail with reference to FIGURES 10-12, the flap closing apparatus 8 comprises a rock shaft 62 extending across the transport conveyor 2 and journalled for rocking motion in a pair of bearing brackets 63—63 rising from the machine frame. Opposed swinging flap closers 65—65 keyed to rock shaft 62, are engageable with the side flaps 28 on the trailing side of the tray as shown in FIGURE 12. The rock shaft is reciprocated in time with stepwise advancements of the conveyor to swing the flap closers 65 from the position shown in broken lines to the position shown in full lines (FIGURE 12). Thus, as the transport conveyor 2 advances the tray, the side flaps 28 on the leading side, as indicated at H (FIGURE 12) are intercepted by the ends of the closer plates 58 and folded to closed position, then the flap closers 65 swing to the position shown in full lines to close the flaps on the trailing side, as indicated at J as they approach the ends of the plates 58.

As shown in FIGURE 10, the swinging flap closers 65 are actuated by an eccentric 66 mounted on the common drive shaft 11 and having a yoke 67. An actuating rod 68 projects from the yoke and has its upper end pivotally connected as at 70 to an arm 71 (FIGURES 12 and 14) projecting from the rock shaft 62. The eccentric 66 and associated linkage shifts the swinging flap closers 65—65 in time with the stepwise advancements of the tray from the loading station.

As noted earlier, the liquid adhesive is applied to the flaps by the opposed glue rollers 56 which are rotated in the direction of tray advancement, as indicated by the arrows in FIGURE 11. Each glue roller 56 is mounted upon a vertical drive shaft 72 projecting upwardly through the respective glue sumps 73—73 which collect the glue as it drains from the rolls. The liquid glue is supplied to the rolls by the supply conduits 74—74 (FIGURE 11) and the excess glue is scraped from the rolls by the respective spring-loaded scrapers 75—75 which bear against the periphery of the rollers. The glue drains from the sumps 73 to a suitable pumping apparatus (not shown) to be re-circulated back to the rolls by way of the conduits 74. The periphery of each glue roll includes a suitable printing area, such as a roughened surface, to print the pattern 55 (FIGURE 5) on the advancing flap, while the scraper removes the glue from the smooth surface of the roller. Since the gluing apparatus is well known in the art, the structural details have been omitted from this disclosure.

For rotating the glue rolls 56, the lower end of each drive shaft 72 includes a helical gear 76 meshing with a driving gear 77 mounted on the respective cross shaft sections 78—78 (FIGURES 10 and 12). The cross shaft sections are journalled in bearing brackets 80—80 carried by the machine frame. The outer end of each shaft section 78 includes a driven sprocket 81 in driving connection with a pair of driving sprockets 82—82 through a sprocket chain 83 (FIGURES 13 and 14). The driving sprockets are keyed to the drive shaft 17 of the intermittent transport conveyor, as shown in FIGURE 17, such that the glue rolls are advanced intermittently with the transport conveyor. The driving ratio is such that the printing areas of the glue rollers register with the edge portions of the main flaps 30 to properly locate the glue patterns 55—55. The gear train which drives the several components is described later with reference to FIGURES 13 and 17.

*Flap Sealing Apparatus*

As noted above, the tray advances from the folding and gluing station 7 with the side flaps 28 closed and with the main flaps 30 freshly glued (FIGURE 5). During the next stepwise advancement, the freshly glued main flaps 30 are progressively closed by the plates 61 (FIGURES 14 and 16), as the tray approaches the receiving end of the sealing station 8, where pressure is applied intermittently to the closed flaps 30 during the conveyor dwell periods. The pressure is applied by opposed reciprocating bars 84—84 which reside along opposite sides of the transport conveyor 2 in a position to engage the flaps at opposite ends of the tray. As viewed in FIGURES 15 and 16, the reciprocating bars 84 coact with respective stationary bars 85—85, which have leading ends 86 which reside adjacent the downstream ends of the stationary closer plates 61—61. The stationary bars 85 establish a sliding contact with the closed end flaps 30 as the trays advance through the sealing section 8. As explained in detail below, the reciprocating bars 84 are shifted outwardly to a release position during the stepwise advancement of the tray and are shifted into pressure engagement with the flaps during the conveyor dwell period. During the advancement of the trays with the reciprocating bars 84 open, the stationary bars 85 keep the flaps closed until pressure again is applied by the reciprocating bars 84 during the next dwell period.

Described in detail (FIGURES 14, 15 and 16), the stationary bars 85 are supported by brackets 87—87 mounted upon a suitable framework 88. Each reciprocating bar 84 is generally channel-shaped in cross section and includes sets of upper and lower presser blocks 90 straddling the stationary bars 85. The blocks 90 are located to register with the glue patterns 55—55 of the flaps so as to localize the sealing pressure which reacts against the boxes packed in the tray. The sets of blocks are located to register with the ends of the several trays during intermittent advancement through the sealing station.

The reciprocating bars 84 are supported by opposed pairs of slide rods 91—91 having outer portions slidably supported in respective slide bearings 92—92 mounted on the frame at opposite sides of the transport conveyor. The reciprocating bars are actuated in time with the conveyor by a cam 93 mounted on shaft 11 and having a closed track 94 in running engagement with a follower 95 of a cam lever 96. The upper end of cam lever 96 is clamped to a rock shaft 97 which is journalled in a pair of bearing brackets 98—98 (FIGURE 16). Clamped to the rock shaft is a pair of actuating arms 100—100 extending above the rock shaft 97. The upper ends of the two arms 100 include pivoted links 101—101 connected to the lugs 102—102 of the respective slide rods 91 which support the left hand reciprocating bar 84.

The rock shaft 97 further includes a third actuating arm 103 projecting upwardly between the arms 100 for actuating the right hand reciprocating bar 84 (FIGURES 15 and 16). For this purpose, there is provided a rock shaft 104 journalled in bearings 105—105 on the right hand side of the conveyor and having clamped thereto a pair of actuating arms 106—106 similar to the arms 100. The arms 106 are connected by similar links 101 and lugs 102 to the slide rods 91 of the right hand bar 84. The rock shaft 104 includes a downwardly extended arm 107 connected by a link 108 to the third arm 103 of rock shaft 97.

The arrangement is such that cam lever 96 resides in the position shown in full lines (FIGURE 15) during the conveyor dwell period to apply pressure to the flaps through the opposed reciprocating bars 84—84; the cam then shifts the lever to the position shown in broken lines to release the bars during the stepwise advancement of the conveyor. Therefore, sealing pressure is applied to each tray four times during advancement between the opposed bars so that the glue is thoroughly set as the trays advance beyond the sealing station 8.

As the loaded trays are advanced intermittently from the downstream end of the sealing station 8 (FIGURE 14) each tray dwells, as indicated at K, in alignment with the discharge station 10. During the dwell period, the sealed tray 110 is discharged laterally from its conveyor bucket or carrier 5 to a delivery chute (not shown) which is mounted in a stationary position adjacent the end of the conveyor carrier at the unloading station. From the delivery chute, the trays may be fed to a conveyor for advancement through a wrapping machine or other handling equipment.

Having described my invention, I claim:

1. In a packaging machine for loading and sealing trays having a main flap and a pair of side flaps at opposite ends, said machine having an intermittent transport conveyor for advancing the trays with articles loaded therein and having flap folding means for folding said side flaps inwardly against the articles at opposite ends of the tray and means for applying adhesive to the main flaps and for folding the main flaps to a closed position overlapping the folded side flaps, a flap presser mechanism located along opposite sides of the transport conveyor for applying sealing pressure to the said main flaps from opposite ends of the tray, said presser mechanism comprising, a pair of elongated reciprocating presser elements extending along the transport conveyor and engageable with said main flaps at opposite ends of the tray, actuating means connected to said reciprocating presser elements for shifting the same toward one another, thereby to engage and press the end flaps during the conveyor dwell period, said actuating means shifting the presser elements outwardly during advancement of the tray by the transport conveyor, and opposed stationary holding elements generally co-extensive with the reciprocating presser elements, said reciprocating presser elements having portions straddling said stationary holding elements, said holding elements adapted to hold said end flaps in closed position when the reciprocating presser elements are shifted outwardly from one another, said presser elements adapted to impose repeated applications of pressure in time with the advancement of the intermittent transport conveyor, thereby to set the adhesive during stepwise advancement of the tray between the presser elements.

2. In a packaging machine for loading and sealing trays having a main flap and a pair of side flaps at opposite ends, said machine having an intermittent transport conveyor for advancing the trays with articles loaded therein and having flap folding means for folding said side flaps inwardly against the articles at opposite ends of the tray, and means for applying adhesive to the main flaps and for folding the main flap to a closed position overlapping the folded side flaps, a flap presser mechanism located along opposite sides of the transport conveyor for applying sealing pressure to the said main flaps from opposite ends of the tray, said presser mechanism comprising a pair of elongated reciprocating presser bars extending along the transport conveyor, upper and lower sets of individual presser elements spaced apart from one another along said reciprocating presser bars, said presser elements being engageable with said said main flaps at opposite ends of the tay, actuating means connected to said reciprocating presser bars for shifting the same toward one another, thereby to force said upper and lower sets of presser elements into engagement with the end flaps during the conveyor dwell period, said actuating means shifting the bars outwardly during advancement of the tray by the transport conveyor, and elongated stationary elements residing along opposite sides of the transport conveyor parallel and substantially coextensive with said reciprocating presser bars, said upper and lower sets of presser elements of said presser bars straddling said elongated stationary elements, said stationary elements adapted to hold said main flaps in closed position when the reciprocating presser bars are shifted to open position, thereby to set the adhesive through repeated applications of pressure by said presser elements during stepwise advancement of the tray between the reciprocating presser bars.

3. In a packaging machine for loading and sealing trays having a main flap and a pair of side flaps at opposite ends, said machine having an intermittent transport conveyor for advancing the trays with articles loaded therein and having flap folding means for folding said side flaps inwardly against the articles at opposite ends of the tray, and means for applying adhesive to the main flaps and for folding the main flap to a closed position overlapping the folded side flaps, a flap presser mechanism located along opposite sides of the transport conveyor for applying sealing pressure to the said main flaps from opposite ends of the tray, said presser mechanism comprising a pair of reciprocating presser bars extending along the transport conveyor and engageable with said main flaps at opposite ends of the tray, actuating means connected to said reciprocating presser bars for shifting the same toward one another, thereby to engage and press the end flaps during the conveyor dwell period, said actuating means shifting the bars outwardly during advancement of the tray by the transport conveyor, and a pair of stationary bars extending along opposite sides of the transport conveyor parallel with the reciprocating presser bars, said stationary bars adapted to slidably engage and hold the main flaps in closed position when the reciprocating bars are shifted to said open position, said reciprocating presser bars and stationary bars having a length equal to at least two stepwise advancements of the carrier and tray by the transport conveyor, whereby multiple applications of pressure act upon the flaps to set the adhesive during advancement between said bars.

4. A flap presser mechanism for a packaging machine adapted to load and seal trays having a main flap and a pair of side flaps at opposite ends, said machine having an intermittent transport conveyor including driving means for advancing the trays with articles loaded therein, said driving means providing stationary conveyor dwell periods, said machine having flap folding means for folding said side flaps inwardly against the articles at opposite ends of the tray, said machine having means for applying adhesive to the main flaps and for folding the main flaps to a closed position overlapping the folded side flaps, said flap presser mechanism located along opposite sides of the transport conveyor for applying sealing pressure to the said main flaps from opposite ends of the tray, said presser mechanism comprising a pair of reciprocating presser bars extending along the transport conveyor and engageable with said main flaps at opposite ends of the tray, actuating means connected to said reciprocating presser bars for shifting the same toward one another along a horizontal plane, said actuating means being interconnected with the said driving means of the intermittent transport conveyor, thereby to engage and press the end flaps during the conveyor dwell periods, said actuating means shifting the presser bars outwardly during advancement of the tray by the transport conveyor, and stationary elements residing along opposite sides of the transport conveyor adapted to slidably engage and hold said main flaps in closed position when the reciprocating presser bars are shifted to said outward position, said reciprocating presser bars having a length equal to a plurality of stepwise advancements of the conveyor and trays thereon, whereby multiple applications of pressure act upon the flaps to set the adhesive thereof.

5. A flap presser mechanism for a packaging machine adapted to load and seal trays having a main flap and a pair of side flaps at opposite ends, said machine having an intermittent transport conveyor including drive means for advancing the trays with articles loaded therein, said driving means providing stationary conveyor dwell periods, said machine having flap folding means for folding said side flaps inwardly against the articles at opposite ends of the tray, said machine having means for applying adhesive to the main flaps and for folding the main flaps to a closed position overlapping the folded side flaps, said flap presser mechanism located along opposite sides of the transport conveyor for applying sealing pressure to the said main flaps from opposite ends of the tray, said presser mechanism comprising respective pairs of reciprocating presser bars extending along the transport conveyor and engageable with said main flaps at opposite ends of the tray, each pair of reciprocating presser bars being spaced apart from one another and disposed in parallel relationship, actuating means connected to said reciprocating presser bars for shifting the same toward one another, said actuating means being interconnected with the said driving means of the intermittent transport conveyor, thereby to engage and press the end flaps during the conveyor dwell periods, said actuating means shifting the bars outwardly during intermittent advancement of the tray by the transport conveyor, and stationary bars residing along opposite sides of the transport conveyor, said stationary bars residing between and parallel with the respective pairs of reciprocating presser bars and adapted to slidably engage the main flaps for holding said main flaps in closed position when the reciprocating presser bars are shifted to open position, thereby to set the adhesive by repeated applications of pressure by the presser bars during stepwise advancement of the tray between the presser bars.

References Cited in the file of this patent
UNITED STATES PATENTS

| | | |
|---|---|---|
| 1,968,190 | Clark | July 31, 1934 |
| 2,061,886 | West | Nov. 24, 1936 |
| 2,970,526 | Gobalet | Feb. 7, 1961 |